United States Patent Office 3,039,330
Patented June 19, 1962

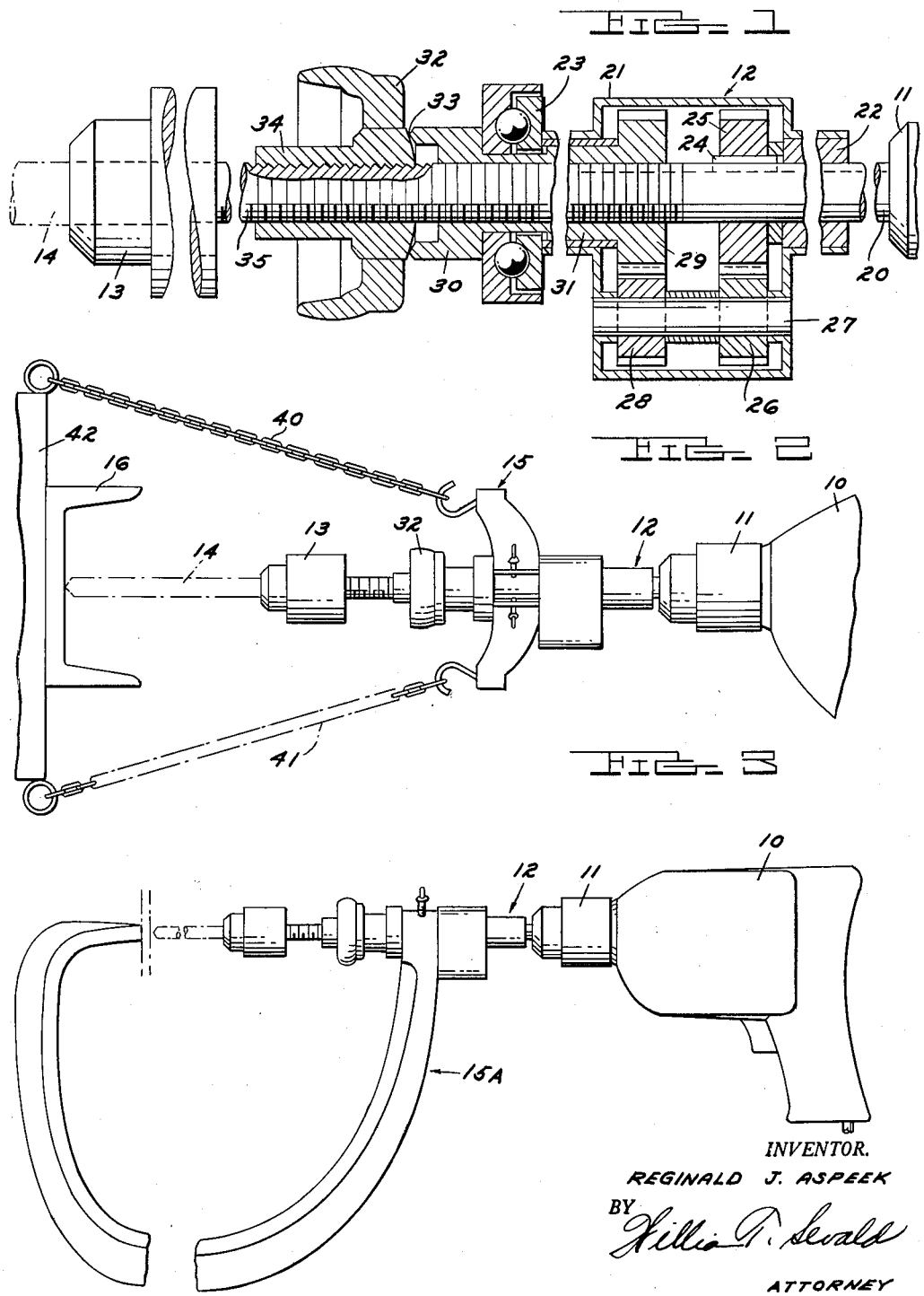

3,039,330
POWER FEED DEVICE
Reginald J. Aspeek, 8403 Millis Road, Utica, Mich.
Filed Sept. 12, 1960, Ser. No. 55,343
5 Claims. (Cl. 77—34.4)

This invention relates to a power feed device particularly suitable for powered hand drills to effect automatic feed in conjunction with rotational drilling.

Powered hand tools and automatic feeds have been employed heretofore to facilitate the drilling of holes in various items, however, the several devices of the prior art have not proven entirely satisfactory inasmuch as they are complicated in design and construction, expensive to manufacture, difficult to use, and clumsy in handling.

With the foregoing in view, the primary object of the invention is to provide a power drill and automatic feed which is simple in design and construction, inexpensive to manufacture, easy to use, and easy to adapt, mount, and secure.

An object of the invention is to provide an automatic power feed for a power hand tool which is easily annexed by merely inserting same in the tool chuck.

An object of the invention is to provide easily adjustable anchoring means for securing the automatic power feed mechanism relative to a work piece so as to relieve the operator of the strain of driving the drill through the work piece.

An object of the invention is to provide an easily adjustable power feed mechanism which is easily, quickly, manually extensible to engage the work piece and which is easily, manually retractable for the next operation.

An object of the invention is to provide adaptable anchoring means for the power feed mechanism which are easily interchangeable.

An object of the invention is to provide a gear train in conjunction with the drive shaft leading to the drill which automatically feeds the drill forward in conjunction with rotational speed and the lead of the drill as predetermined as desired.

These and other objects of the invention will become apparent by reference to the following description of an automatic feed for powered hand tools embodying the invention taken in connection with the accompanying drawing in which:

FIG. 1 is a longitudinal cross-sectional view of the automatic power feed mechanism, partly broken away and partly in elevation, showing the power hand tool chuck at the right and the drill at the left.

FIG. 2 is a smaller side elevational view of the inventive device in conjunction with one form of anchoring means; and FIG. 3 is a side elevational view similar to FIG. 2, partly broken away, showing a different type of anchoring means.

Referring now to the drawing wherein like numerals refer to like and corresponding parts throughout the several views, the automatic feed, anchoring devices, and hand power tool disclosed therein to illustrate the invention comprise a powered tool 10 having a chuck 11 holding, supporting, and driving the automatic power feed mechanism 12 which is equipped with a chuck 13 holding and driving the drill 14, and anchoring means 15 and 15a for holding and securing the device relative to a work piece 16.

More particularly the drive shaft 20, FIG. 1, is fixed in the hand power tool chuck 11 and extends straight through the power feed device 12 to the drill chuck 13 which rotatably supports the drill 14. The gear case 21 surrounds the shaft 20 and is equipped with a bearing 22 at one end and a bearing 23 at the other end facilitating rotation of the drive shaft 20 relative to the stationary case 21 and obviously one half the bearing 23 adjacent the case remains stationary while the other half remote from the case is rotatably mounted for movement with the drive shaft 20 and associated parts.

The drive shaft 20 is equipped with a longitudinal slot which slidably engages the key 24 on the gear 25 so that the drive shaft 20 is drivingly connected to the gear 25 although axially slidable relative thereto for effecting feed. The gear 25 drives the pinion 26 fixed on the shaft 27, which drive is imparted to the pinion 28 and the gear 29 which rotatably surrounds the shaft 20 but which is not mechanically engaged therewith so that a relative rotation occurs therebetween. This relative rotation is occasioned by the fact that the pinion 26 has less teeth than the pinion 28 so that the gear 29 turns more slowly than gear 25 but they do not turn perceptively more slowly in action but appear to be traveling about the same rate of speed, but due to their difference, the drive shaft 20 is fed axially outwardly as hereinafter particularly set forth.

The gear 29 is drivingly connected to the hub 30 via the sleeve 31 and it can now be seen that one half of the bearing 23 rotates with the hub 30 while the other half remains stationary with the case 21. The hub 30 has a conical nose portion engaging the conical engagement portion of the hand wheel 32 as at 33 and the hand wheel sleeve 34 is internally threaded and in threaded engagement with the drive shaft 20 threaded portion 25 and it can now be understood that the only portion threadwise engaged with the threaded portion of the drive shaft is the hand wheel sleeve 34.

Due to the fact that the anchoring device 15 or 15a engages the case 21 in the stationary portion of the bearing 23, it holds the case 21 in stationary relationship torquewise relative to the rotation parts and anchorwise relative to the outward feed of the shaft and drill.

Upon the power tool 10 driving the shaft 20 it will be understood that a one-to-one relationship obtains relative to the drill 14 whereas, due to the reduction through the gear train a one to one relationship does not obtain relative to the hand wheel 32 so that the difference in rotation causes the shaft thread portion 35 to thread outwardly relative to the hand wheel threaded sleeve 34 to effect the power feed of the drill 14 in conjunction with its rotational action.

In operation the user attaches the anchoring device 15 between the case 21 and stationary portion of the bearing 23 and then attaches the chains 40 and 41 to an anchor 42 or the chain 40—41 can be continuous and merely wrapped around the I-beam 16. The user then turns the hand wheel 32 relative to the shaft 20 so as to extend the point of the drill 14 into engagement with the I-beam 16 whereupon by operating the powered hand tool 10 the drill is driven rotationally and automatically fed forwardly due to the fact that a hand wheel frictionally engages with the hub 30 and effects the power drive due to the rotational difference between the hand wheel sleeve 34 and the shaft threaded portion 35. However, it is to be understood that during drilling the hand wheel 32 is apparently turning as fast as the shaft 35 so that the rotational difference while not visually perceptive is actually operative to effect the axial feed. The device of FIG. 3 is different from the device of FIG. 2 in the anchoring means 15a which constitutes a C-clamp having a portion attachable to the power feed mechanism similar to the device seen in FIG. 2. After a hole has been drilled, the user shuts off the power tool 10 and then manually reversely turns the hand wheel 32 to move it towards the chuck 13 whereby the device can be rapidly returned to its initial starting position.

The inventive power feed device with these features comprises a compact, durable, neat appearing mechanism easily operated to effect power feeding with hand tools and it is obvious that the utility of the device is extremely high due to the fact that it relieves the operator of the strain of forcing the drill through the work piece.

Although but a single embodiment of the invention has been shown and described in detail, it is obvious that many changes may be made in the size, shape, detail and arrangement of the various elements of the invention within the scope of the appended claims.

I claim:

1. A power feed device for automatically axially advancing a tool during angular rotation comprising, a gear case, an anchor on said case for attaching and fixing said case relative to a workpiece, a shaft rotatably and axially slidably disposed in said case, a first gear in said case axially slidably disposed on said shaft and slidably keyed to said shaft for relative rotation therewith, a second gear concentrically disposed around said shaft axially aligned with said first gear, a first pinion gear engaging said first gear, a second pinion gear engaging said second gear, a pinion shaft connecting said pinion gears together; said gears and pinions being so coordinated that the rotational speed of said second gear is different from said first gear; a sleeve concentrically disposed on said shaft connected to said second gear, a drive hub on said sleeve; said shaft being threaded in the area of said hub; and a hand wheel threaded on said shaft adjacent said hub; said hand wheel and hub having friction drive engagement faces for imparting the rotation speed of said second gear thereto whereby said hand wheel turning at a different r.p.m. from the shaft effects a power feed; tool holding means on said shaft threaded end, and power means driving said shaft; the axial projection of said shaft being quickly adjustable via manually turning said hand wheel.

2. A power feed device for automatically axially advancing a tool during angular rotation comprising, a gear case, an anchor on said case for attaching and fixing said case relative to a workpiece, a shaft rotatably and axially slidably disposed in said case, a first gear in said case axially slidably disposed on said shaft and slidably keyed to said shaft for relative rotation therewith, a second gear concentrically disposed around said shaft axially aligned with said first gear, drive means interconnecting said gears, said gears and drive means being so coordinated that the rotational speed of said second gear is different from said first gear; a sleeve concentrically disposed on said shaft connected to said second gear, a drive hub on said sleve; said shaft being threaded in the area of said hub; and a hand wheel threaded on said shaft adjacent said hub; said hand wheel and hub having friction drive engagement faces for imparting the rotation speed of said second gear thereto whereby said hand wheel turning at a different r.p.m. from the shaft effects a power feed; tool holding means on said shaft threaded end, and power means driving said shaft; the axial projection of said shaft being quickly adjustable via manually turning said hand wheel to either advance or retract a tool relative to a workpiece.

3. A power feed device for automatically axially advancing a tool during angular rotation comprising, a gear case, an anchor on said case for attaching and fixing said case relative to a workpiece, a shaft rotatably and axially slidably disposed in said case, power means rotating said shaft, a sleeve concentrically disposed on said shaft, a drive hub on said sleeve; said shaft being threaded in the area of said hub; a hand wheel threaded on said shaft adjacent said hub; a gear train driving said sleeve and hub; said hand wheel and hub having friction drive engagement faces for imparting the rotation speed of said gear train thereto whereby said hand wheel turns at a different r.p.m. from the shaft effecting a power feed; tool holding means on said shaft threaded end; the axial projection of said shaft being quickly adjustable via manually turning said hand wheel.

4. A power feed device particularly suitable for axially advancing a tool such as a drill in conjunction with power driven rotation comprising a motor, a drive shaft driven by said motor, means on said shaft for holding a tool, a first gear axially slidably disposed and rotationally keyed to said drive shaft, a second gear and sleeve freely concentrically disposed on said shaft, first and second pinion gears respectively meshing with said first and second gears, a pinion shaft interconnecting said pinion gears so as to impart drive from said first gears to said second gear to said sleeve, said shaft being threaded in the area of said sleeve, a hub on said sleeve having a friction drive face, a hand wheel threaded on said shaft having a friction drive face in engagement with said hub friction drive face so that said second gear drives said hand wheel rotationally; said gears being so rotationally arranged that said hand wheel turns at a different r.p.m. than said threaded drive shaft so that as both said hand wheel and drive shaft rotate, said shaft screws out of said hand wheel to effect power feed.

5. A power feed device particularly suitable for axially advancing a tool such as a drill in conjunction with power driven rotation comprising a drive shaft adapted to be driven by an electric hand drill, means on said shaft for holding a tool, a first gear axially slidably disposed and rotationally keyed to said drive shaft, a second gear and sleeve freely concentrically disposed on said shaft, first and second pinion gears respectively meshing with said first and second gears, a pinion shaft interconnecting said pinion gears so as to impart drive from said first gears to said second gear to said sleeve, said shaft being threaded in the area of said sleeve, a hub on said sleeve having a friction drive face, a hand wheel threaded on said shaft having a friction drive face in engagement with said hub friction drive face so that said second gear drives said hand wheel rotationally; said gears being so rotationally arranged that said hand wheel turns at a different r.p.m. than said threaded drive shaft so that as both said hand wheel and drive shaft rotate, said shaft screws out of said hand wheel to effect power feed, and anchor means on said device for mechanical connection to a workpiece whereby said device is fixedly based for relative axial power feed.

References Cited in the file of this patent

FOREIGN PATENTS 960,930    France _____ Nov. 7, 1949